Sept. 5, 1950          V. THOMPSON          2,521,552

HAND-OPERATED NUTCRACKER WITH SHIELDS

Filed July 27, 1949

INVENTOR.
Viola Thompson

BY

ATTORNEY.

Patented Sept. 5, 1950

2,521,552

UNITED STATES PATENT OFFICE 2,521,552

HAND-OPERATED NUTCRACKER WITH SHIELDS

Viola Thompson, Washington, D. C.

Application July 27, 1949, Serial No. 107,057

3 Claims. (Cl. 146—14)

This invention relates to nutcrackers and more particularly to those provided with a shield to prevent particles of nut shell from flying away from the nut, to any appreciable distance, during the cracking operation.

With this and other objects in view the invention resides in the novel details of construction and combinations of parts as will be disclosed more fully hereinafter and particularly covered by the claims.

Referring to the accompanying drawings forming a part of this specification and in which like numerals designate like parts in all the views—

Figure 1:
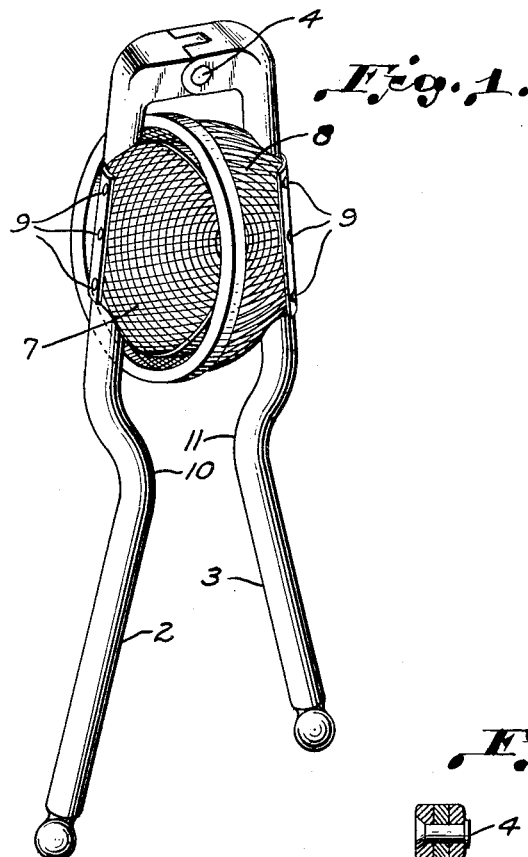
Fig. 1 is a perspective view of a nutcracker made in accordance with this invention.
Figure 2:
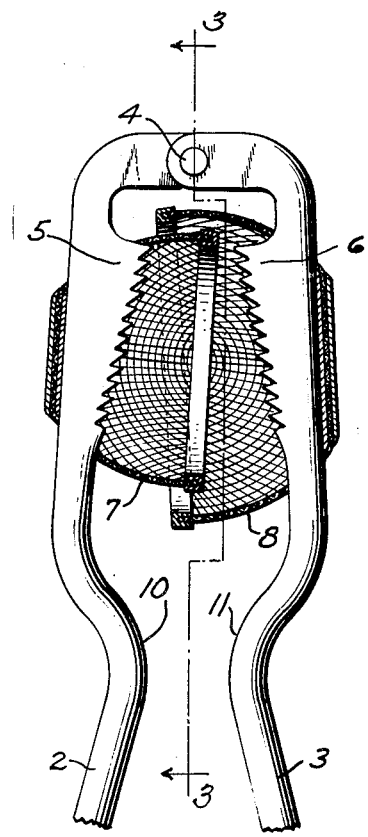
Fig. 2 is a sectional view of the nutcracker taken generally in the common longitudinal plane of the handles.
Figure 3:
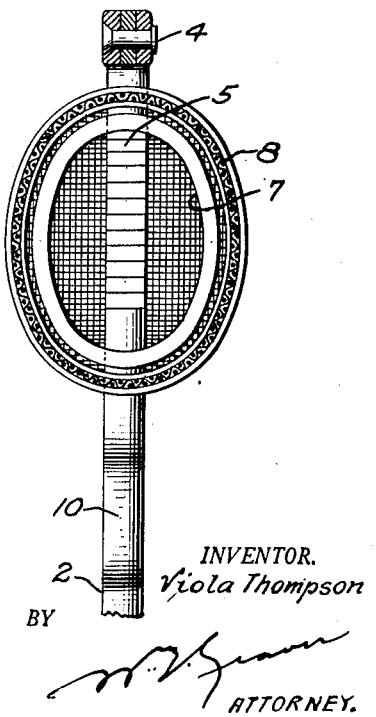
Fig. 3 is a transverse sectional view taken as on the line 3—3 of Fig. 2 and looking in the direction of the arrows.

The nutcracker comprises two similarly formed bar-like handles 2 and 3 pivotally joined together at one end as at 4, and having the respective serrated or roughened anvils 5 and 6 between which a nut can be placed and maintained for cracking by movement of the handles toward each other in the usual and well-known manner. Each handle is provided with a cup-like shield adapted to interfit and to cooperate with the shield of the companion handle during the cracking operation, whereby particles of nut shell are restrained and/or kept from flying or being projected away from the immediate area of the nut, the such flying or projection sometimes resulting in possible injury to a bystander or at least resulting in creating debris on the floor.

More specifically the handles 2 and 3 have the respective similar hollow shields 7 and 8 attached thereto in any convenient manner (spot-welding being indicated at 9 in the drawings), each shield being made of any suitable metallic or other material, and in any shape, as desired. Preferably the shields are reticular or foraminate to reduce the weight thereof, and are semi-spherical (or ovate) in shape to surround the nut during its cracking.

The two shields are complemental with respect to each other in that, during the cracking operation, the arcuate rim or edge portion of one shield relatively closely fits within the corresponding edge portion of the other shield, thereby creating an interfitting or lapping closure constituting a cage around the nut. The mounting is such that a bar-like handle has a portion thereof which passes through its cup-like shield, whereby to shield the anvil as well as the nut.

The handles may have any suitable formation so long as proper leverage may be had for cracking the nut, and therefore the construction shown in the drawings is given for the purpose of example only. Means may be provided for limiting the closing movement of the handles in order to give protection to the two shields, one such means being illustrated as comprising the opposing abutments 10 and 11 carried by the handles 2 and 3 respectively.

By this invention there is provided a cage-like shield comprising two hollow cup-like members complementally interfitting during the cracking of the nut whereby to surround the nut and thus catch and hold any shell particle which might otherwise be projected away from the nut. Due to the nut being surrounded during the cracking thereof, the nutcracker may be operated with equal results by either a right or left-handed person, or in other words the nutcracker does not have to be picked up and operated in any special manner.

It is obvious that those skilled in the art may vary the details of construction and arrangements of parts without departing from the spirit of this invention wherefore it is desired not to be limited to the exact foregoing disclosure except as may be required by the claims.

What is claimed is:

1. A nutcracker provided with two pivoted handles and a shield carried by each handle, said handles provided with oppositely disposed roughened nut engaging surfaces, each shield being hollow and curviform, one shield having a free edge the perimeter of which is greater than the perimeter of the free edge of the other shield, the two free edges interfitting when brought together, the two shields having complemental relation to each other providing an overlapping closure completely surrounding the nut being cracked.

2. A nutcracker provided with two pivoted handles and a shield carried by each handle, said handles provided with oppositely disposed roughened nut engaging surfaces, each shield being hollow and curviform, a portion of a handle passing through the wall of the shield carried thereby with the nut engaging surface disposed entirely within said shield, the two shields having complemental relation to each other providing an overlapping closure completely surrounding the nut being cracked.

3. A nutcracker provided with two pivoted handles and a shield carried by each handle, said handle provided with oppositely disposed roughened nut engaging surfaces, each shield being hollow and curviform, one shield having a free edge the perimeter of which is greater than the perimeter of the free edge of the other shield, the two free edges interfitting when brought together, a portion of a handle passing through the wall of the shield carried thereby with the nut engaging surface disposed entirely within said shield, the two shields providing a cage completely surrounding the nut being cracked.

VIOLA THOMPSON.

REFERENCES CITED

The following references are of record in the file of this patent:

UNITED STATES PATENTS

| Number | Name | Date |
|---|---|---|
| 1,598,490 | Miller | Aug. 31, 1926 |
| 1,710,629 | Lindsey | Apr. 23, 1929 |

FOREIGN PATENTS

| Number | Country | Date |
|---|---|---|
| 592,955 | Germany | Feb. 19, 1934 |
| 769,670 | France | June 11, 1934 |